(12) United States Patent
Ohtsuki et al.

(10) Patent No.: US 6,224,266 B1
(45) Date of Patent: May 1, 2001

(54) WHEEL BEARING DEVICE

(75) Inventors: Hisashi Ohtsuki; Shinji Nishio, both of Shizuoka (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 09/395,190

(22) Filed: Sep. 14, 1999

(30) Foreign Application Priority Data

Sep. 18, 1998 (JP) .................................................. 10-265051
Dec. 22, 1998 (JP) .................................................. 10-364741

(51) Int. Cl.$^7$ ....................................................... F16C 17/10
(52) U.S. Cl. .......................... 384/571; 384/589; 384/912; 384/913; 384/625
(58) Field of Search ..................................... 384/571, 589, 384/913, 912, 625, 544

(56) References Cited

U.S. PATENT DOCUMENTS

| 3,937,535 | 2/1976 | Ladin . |
| 4,179,167 | 12/1979 | Lura et al. . |
| 5,037,214 | 8/1991 | Dougherty . |
| 5,259,676 | 11/1993 | Marti . |

FOREIGN PATENT DOCUMENTS

| 2374172 | 7/1978 | (FR) . |
| 2117459 | 10/1983 | (GB) . |

*Primary Examiner*—Lenard A. Footland
(74) *Attorney, Agent, or Firm*—Wenderoth, Lind & Ponack, L.L.P.

(57) ABSTRACT

A wheel bearing device is proposed which maintains long life even under high-load, high-temperature conditions. On the surfaces of inner rings and tapered rollers of a multiple-row tapered roller bearing rotatably supporting a wheel, carburized, nitrided layers are formed which contain 0.80 wt % or more carbon and have a Rockwell hardness of 58 or over with the residual aaustenite content being 25–35 vol % to improve mechanical properties and fatigue characteristics of these parts and also keep the surface layers of these parts of suitable toughness, thereby improving the life of the wheel bearing device in a high-load, high-temperature environment. Also, an annular recess is formed in the inner periphery of the outer ring at a portion between the rows of the raceways.

18 Claims, 5 Drawing Sheets

WHEEL BEARING DEVICE

BACKGROUND OF THE INVENTION

This invention relates to a wheel bearing device for supporting a wheel on an axle through tapered roller bearings.

Tapered roller bearings are bearings suited to bear radial load, axial load and their combined load. Due to their large load capacity, they are used to support axles of automobiles.

FIG. 5 shows an example of a wheel bearing device for a non-driven wheel of a truck. This wheel bearing device has a double-row tapered roller bearing 22 having a pair of inner rings 23 mounted on an axle 21. A hub 26 and a brake rotor 27 are fixed by bolts 28 to an outwardly extending flange 25 provided at one end of an outer ring 24. The inner rings 23 are prevented from coming out by a nut 29. A hub 26 carries wheel mounting bolts 30.

On the inner-periphery of the outer ring 24, two rows of raceways 31 are formed. Opposite the raceways 31, the pair of inner rings 23 are formed each with rows of raceways 32, respectively. Between these pairs of opposed raceways 31 and 32, a plurality of tapered rollers 33 are provided in two rows. The tapered rollers 33 roll with their large-diameter ends 34 abutting with flanges 35 provided at outer ends of the pair of inner rings 23, respectively.

Thus, the hub 26 and the brake rotor 27 fixed to the outer ring 24 are supported so as to be rotatable relative to the axle 21.

A contact type rubber seal 36 is provided at the inner end, that is, the end near the center of the axle 21, of an annular space in which the tapered rollers 33 are arranged in two rows. A cap 37 covers the outer end, i.e. the end near the end of the axle 21 together with the end of the axle on which is mounted the nut 29 to prevent scattering of lubricating grease in the bearing and entry of dust and water from outside.

The bearing portion of such a wheel bearing device as described above is periodically greased and maintained. With increasing horsepower and loading capacity of modern cars, higher resistance to high loading and high temperature during high-speed cruising are required for wheel bearing devices. Long-term maintenance-freedom is also desired. Under high-load, high-temperature conditions, grease sealed in the bearing portion of a wheel bearing device tends to deteriorate quickly. Thus a highly heat-resistant, long-life grease is desired. Also, it is required to maintain long life of bearing members under high-load, high-temperature conditions.

As mentioned above, since tapered rollers of a tapered roller bearing roll with their large-diameter ends abutting with the flanges of the inner rings, heat is produced at the sliding portions between the roller ends and the flanges. The higher the load, the higher the contact pressure between the roller ends and the flange, and thus the greater the heat produced.

Heretofore, for the inner circumferential surface shape of the outer ring 24, the portion between the pair of raceways 31 was made straight and no measure for reducing weight has been taken. Also, one of the factors that influence the bearing life is whether the lubricating condition is good or bad. The amount of lubricating grease sealed depends on the volume of the internal space of the bearing. But heretofore, it was not structured taking into account the amount of sealed grease, so that there was a limit on the amount of grease.

An object of this invention is to provide a wheel bearing device which assures long life even under high-load, high-temperature conditions.

Another object of this invention is to reduce the weight of a wheel bearing device for an axle and to increase its life.

SUMMARY OF THE INVENTION

According to this invention, there is provided a wheel bearing device comprising a tapered roller bearing for rotatably supporting a wheel on an axle, the tapered roller bearing including an outer ring having a raceway formed on an inner periphery thereof, an inner ring having a raceway on an outer periphery thereof so as to be opposed to the raceway of the outer ring, and a plurality of tapered rollers disposed between the opposed raceways, characterized in that carburized and nitrided layers containing 0.80 wt or more carbon and having a Rockwell hardness of 58 or over are formed on the surfaces of the inner ring or the tapered rollers, the carburized and nitrided layers having a residual austenite content of 25–35 vol %.

Carburized and nitrided layers are formed on the inner rings and tapered rollers for the following reasons. The residual austenite in a carburized layer obtained by ordinary carburizing hardening is high in toughness and work-hardening characteristics. Thus, if it is contained in a suitable amount, it would suppress the development and progression of cracks while maintaining required hardness of the carburized layer. But it is unstable to heat. In contrast, if they are subjected to nitriding treatment under suitable conditions, nitrogen atoms will melt into the residual austenite in a solid state, thus making the residual austenite stable against heat. In a carburized and nitrided layer obtained by nitriding treatment, a greater compressive residual stress is formed than in a carburized layer, so that it is possible to further improve fatigue strength.

The carburized and nitrided layers should contain 0.80 wt % or more carbon and have a Rockwell hardness HRC of 58 or over to reduce friction at sliding portions between the larger ends of the tapered rollers and the flanges of the inner rings. The residual austenite content should be 25–35 vol % to give suitable toughness to the carburized and nitrided layer and to relieve excessive increase in stress due to biting of abrasion powder produced from e.g. the sliding portions and contained in grease. That is to say, if the residual austenite content is less than 25 vol %, toughness is insufficient. If over 35 vol %, the hardness would decrease excessively, resulting in the deterioration of surface roughness due to plastic deformation.

The carburized and nitrided layers as described above can be formed by the following treatment steps. That is, it is heated and held for a predetermined time period while keeping the carbon potential in a carburizing atmosphere at 0.8% or over, and then subjected to carburizing hardening by cooling in oil. It is then heated and held for a predetermined time period in ammonia gas for nitrizing. Nitriding may be carried out during carburizing. In order to adjust the residual austenite content, sub-zero treatment or annealing may be carried out.

To achieve the second object, according to the present invention, the internal space of the bearing is increased by forming an annular recess in the inner periphery of the outer ring at a portion between the rows of the raceways of the outer ring.

Other features and objects of the present invention will become apparent from the following description made with reference to the accompanying drawings, in which:

DETAILED DESCRIPTION OF THE PREFERRED EMBODIMENT

Figure 1:
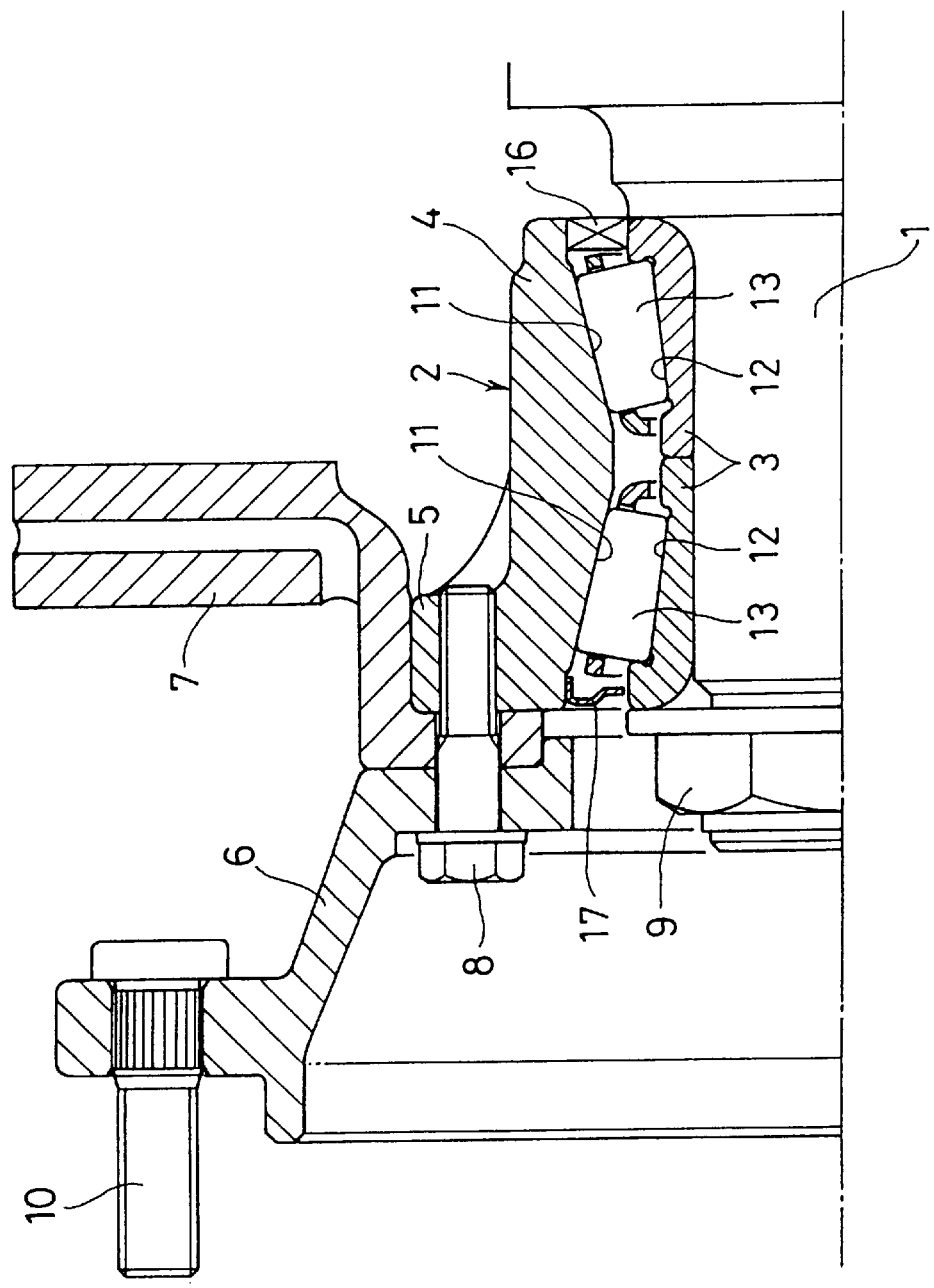
FIG. 1 is a partially omitted vertical sectional view of a wheel bearing device embodying this invention.

With reference to the drawings, embodiments of this invention are described. FIG. 1 shows an embodiment of a wheel bearing device mounted on an axle for non-driven wheels of a truck. This wheel bearing device has a double-row tapered roller bearing 2 having inner rings 3 mounted on an axle 1. A hub 6 and a brake rotor 7 are fixed by bolts 8 to an outwardly extending flange 5 provided at one end of an outer ring 4. The inner rings 3 are prevented from coming out by a nut 9. A hub 6 carries wheel mounting bolts 10.

Figure 2A:
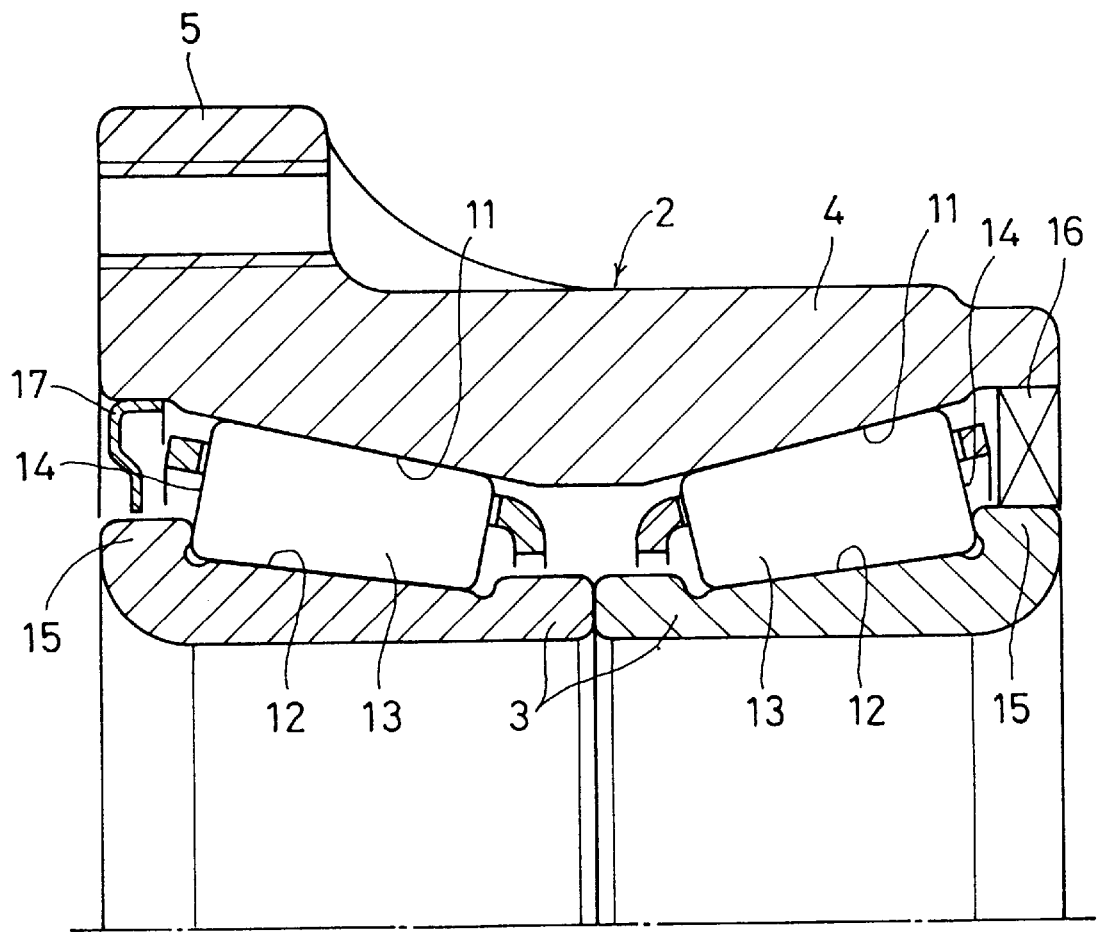
FIG. 2A is a vertical sectional view of the tapered roller bearing of the same.

As shown in FIG. 2A, on the inner periphery of the outer ring 4, two rows of raceways 11 are formed. Opposite pair of the raceways 11, the pair of inner rings 3 are formed with rows of raceways 12, respectively. Between these pairs of opposed raceways 11 and 12, a plurality of tapered rollers 13 are provided in two rows. The tapered rollers 13 roll with their large-diameter ends 14 kept in sliding contact with flanges 15 provided at outer ends of the pair of inner rings 3, respectively.

A contact type rubber seal 16 is provided at the inner end, that is, the end near the center of the axle 1, of an annular space in which the tapered rollers 13 are arranged in two rows. At its outer end, i.e. the end near the end of the axle 1, a noncontact type steel shield 17 is mounted to compactly seal the interior of the bearing defined by the annular space, thereby preventing leakage of sealed grease to stably maintain the sealed amount of grease.

Figure 2B:
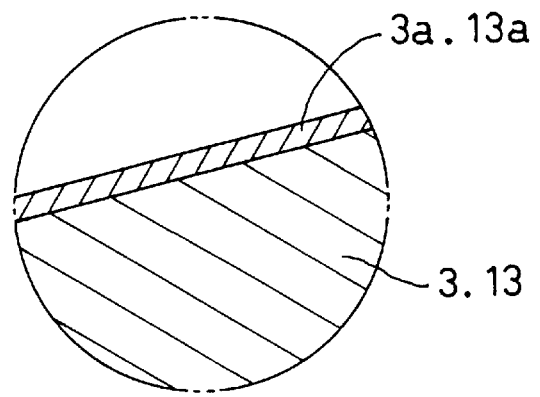
FIG. 2B is a partial enlarged sectional view of FIG. 2A.

The inner rings 3 and the tapered rollers 13 are made of case-hardened steel SCr435. As shown in FIG. 2B, on their surfaces, carburized nitrided layers 3a, 13a containing 0.80 wt % or more carbon, and having a Rockwell hardness HRC of 58 or over and the residual austenite content of 25–35 vol % are formed. For the outer ring 4, induction-hardened structural carbon steel S53C was used.

In this embodiment, SCr435 was used as a material for the inner rings and the tapered rollers. But instead of it, such bearing steels as SCM420, SCM430, SCM435, SCr420, SCr430, SAE5130, SAE8620 may be used. Also, the present invention is applicable to single-row tapered roller bearings and multiple-row (more than two) tapered roller bearings.

Examples of the invention and Comparative Examples are shown below.

Examples of the Invention

Multiple-row tapered roller bearings having inner rings and tapered rollers made of case-hardened steel SCr435 and having on their surfaces caburized nitrided layers containing 0.80 wt % or more carbon, and having a Rockwell hardness HRC of 58 or over and the residual austenite content of 25–35 vol % were prepared (Examples 1–3 in Table 1). The bearings measured 65 mm in inner diameter and 130 mm in width.

Comparative Examples

Similar to the Examples, we prepared multiple-row tapered roller bearings having inner rings and tapered rollers made of case-hardened steel SCr435 and having on their surfaces carburized nitrided layers containing 0.80 wt % or more carbon, and having a Rockwell hardness HRC of 58 or over, with only the residual austenite content being out of the range of the present invention (Comparative Examples 1 and 2 in Table 1), a multiple-row bearing in which the residual austenite content was within the range of the present application but only carburized layers were formed on the surfaces of the inner rings and the tapered rollers (Comparative Example 3 in Table 1), and a multiple-row bearing in which only carburized layers were formed, and the residual austenite content was outside the range of the present application (Comparative Example 4 in Table 1). Their dimensions were the same as Examples of the invention.

Multiple-row bearings of Examples and Comparative Examples were each mounted on a shaft of an endurance tester and an endurance life test was conducted.

Test conditions were as follows:
(Endurance life test)
Radial load: 63 kN
Thrust load: 25 kN
Revolving speed: 400 rpm The test results are shown in Table 1. The endurance life in the test was evaluated in terms of the number of revolutions until the L10 life (time period during which 90% of the bearings are usable without any damage) was reached. For the life ratio, the endurance life of Comparative Example 4 was used as a reference.

The multiple-row tapered roller bearings of Examples all showed excellent endurance lives, and their life ratios were 3 times or over that of Comparative Example 4. On the other hand, for Comparative Examples 1–2 in which carburized and nitrided layers were formed but their residual austenite content was out of the range of the present application, the life ratio increased only 30–40%. For Comparative Example 3 in which the residual austenite content was within the range of the present application, but only carburized layers were formed, no improvement was noted.

As described above, in the wheel bearing device of this invention, carburized and nitrided layers containing 0.80 wt % or more carbon, and having a Rockwell hardness HRC of 58 or over, with the residual austenite content being 25–35 vol % are formed on the surfaces of the inner rings and tapered rollers of the tapered roller bearing for supporting an axle. Thus, it is possible to improve the mechanical properties and fatigue characteristics of these parts, and also stably maintain toughness of the surface layers of these parts, and thus improve the endurance life under high-load, high-temperature conditions.

Figure 3:
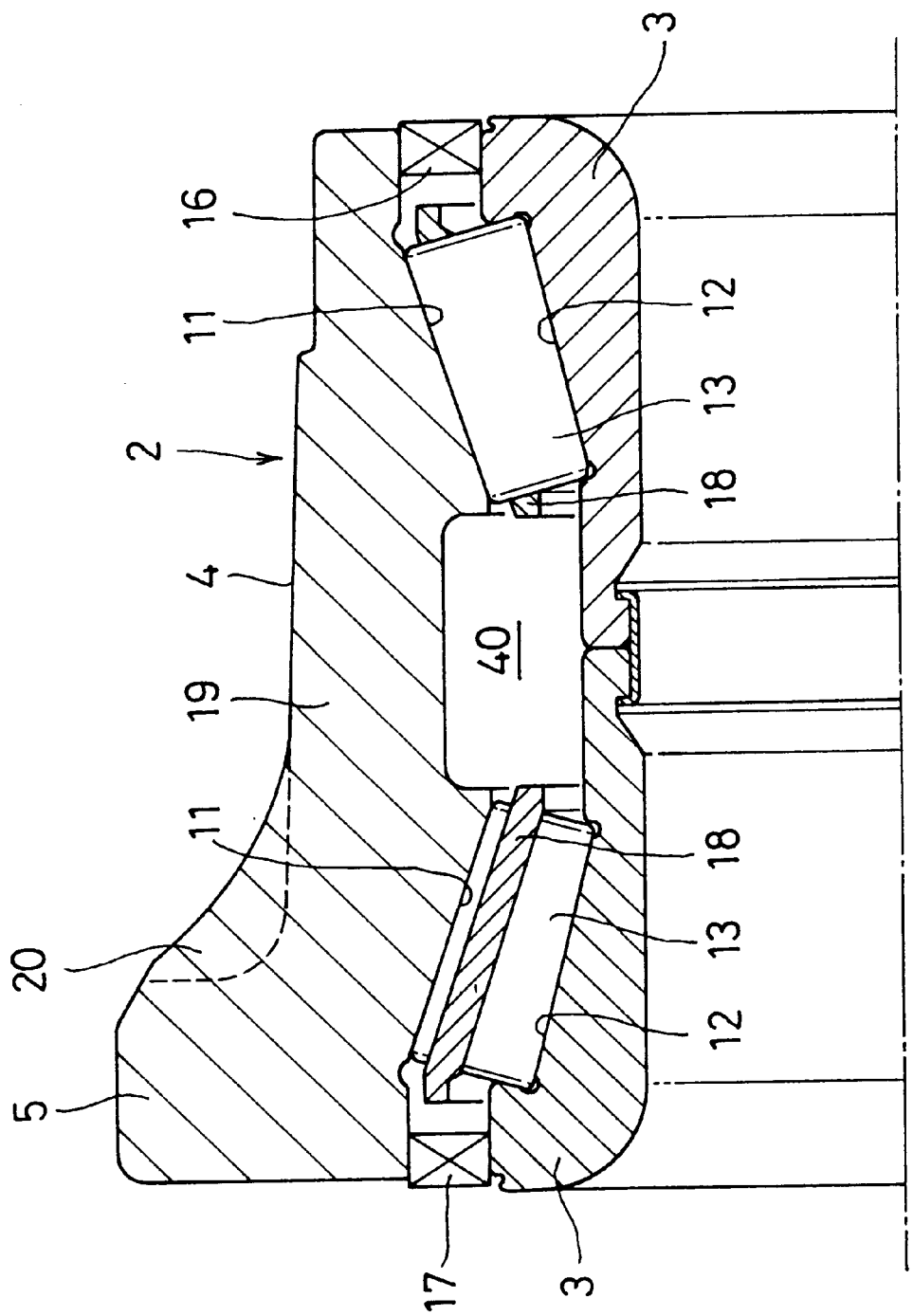
FIG. 3 is a vertical sectional view of another embodiment of this invention.

The embodiment shown in FIG. 3 is, as far as its basic structure is concerned, no different from the wheel bearing device shown in FIG. 1.

The double-row tapered roller bearing 2 comprises a pair of inner rings 3 having raceways 12 formed on the outer peripheral surfaces thereof, an outer ring 4 formed with two rows of raceways 11 on its inner peripheral surface, two rows of tapered rollers 13 disposed between the raceways 12 of the inner rings 3 and the raceways 11 of the outer ring 4, cages 18 for holding the tapered rollers 13 in each row circumferentially spaced from each other, and seals 16, 17 for sealing the annular space of the bearing.

The outer ring 4 has a pair of raceways 11 on which the tapered rollers 13 roll. It includes a substantially cylindrical sleeve portion 19 formed with the two rows of raceways 11 on its inner peripheral surface, a radially outwardly extending flange 5 formed at one end thereof, and a plurality of axially extending ribs 20 provided at a transitional region from the sleeve portion 19 to the flange 5.

At a mid-portion of the two rows of axially adjacent raceways 11, an annular recess 40 is formed. The recess 40 not only functions as a grease reservoir but reduces the weight of the outer ring 4 to a degree corresponding to the volume of the recess 40. Thus, the greater the volume of the recess 40, the greater the degree of contribution to the reduction of weight, and the greater the amount of sealed grease. But, for the radial direction, in view of the strength of the outer ring 4, and for the axial direction, in view of the positional relation with the raceways 11, there are limitations to the volume of the recess. The sectional shape of the recess 40 may be rectangular as shown in FIGS. 3 and 4, or trapezoidal or semicircular.

Figure 4:
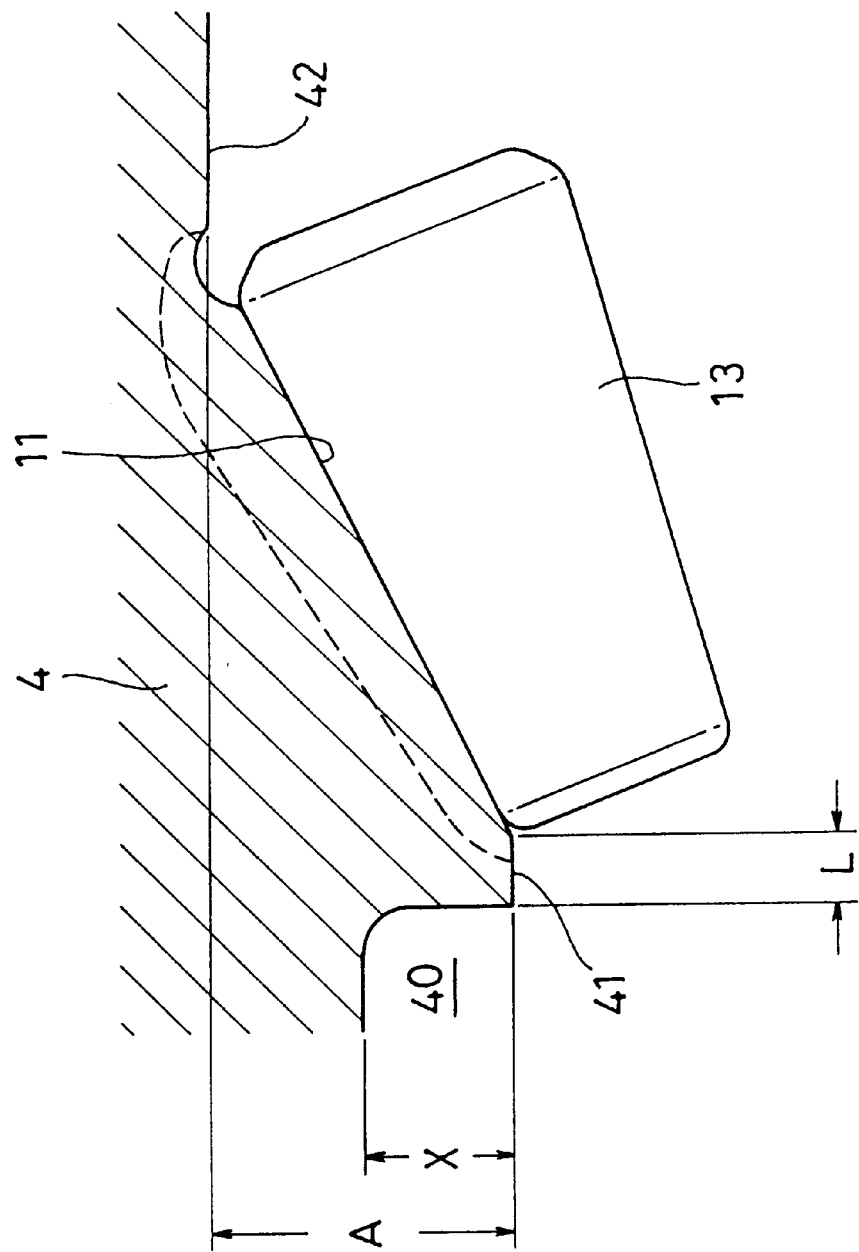
FIG. 4 is a partial enlarged view of FIG. 3.
Figure 5:
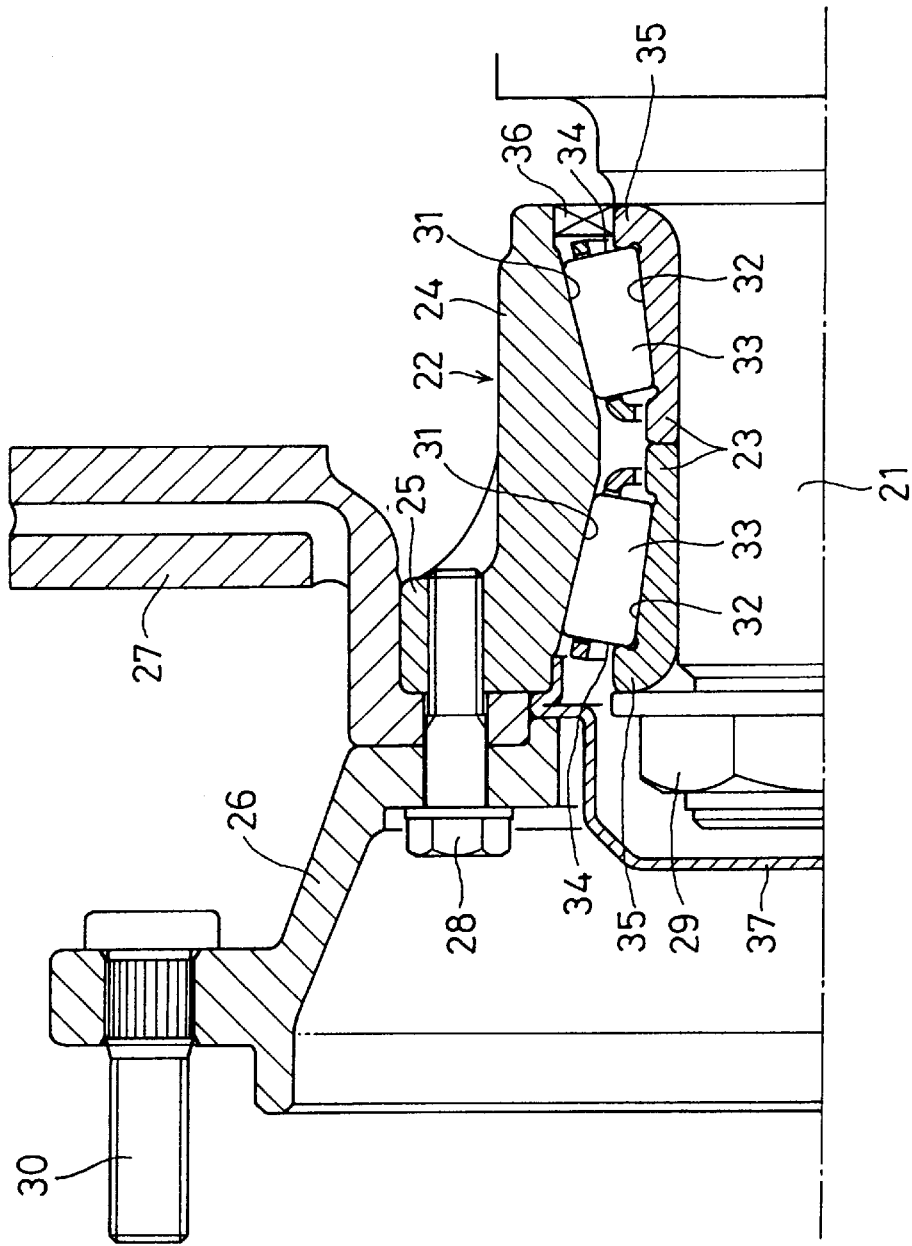
FIG. 5 is a partially omitted vertical sectional view showing a conventional wheel bearing device.

Referring to FIG. 4, the dimension of the recess for optimizing the wall thickness of the outer ring 4 should be determined as follows. For the radial dimension, i.e. depth of the recess 40, in order to ensure the wall thickness of the sleeve portion 19 of the outer ring 4 which can withstand a moment load that acts from the wheel on the bearing, it should be set so that the relation A=2X is met, where X is the depth of the recess 40, and A is the difference in radius between the inner peripheral surface 41 on the side of the smaller ends of the tapered rollers 13 and the inner peripheral surface 42 on the side of the larger ends thereof. For the axial dimension of the recess 40, the distance L from the axial ends of the recess 40 to the ends of the raceways 11 on the smaller ends of the tapered rollers 13 is set at 3 mm or over (L≧3 mm).

Since the raceways 11 are portions which are subjected to large stresses when the tapered rollers 13 roll, preferably the recess 40 starts at positions spaced at least 3 mm away from their ends. The chain line in FIG. 4 represents a hardened layer of each raceway 11.

According to this invention, in a wheel bearing device for an axle which supports a wheel through a double-row tapered roller bearing, excess material between the two rows of raceways of the double-row tapered roller bearing is removed to increase the interior space of the bearing. This makes it possible to reduce weight by increasing the volume of the internal space of the bearing and at the same time extend its life by increasing the amount of sealed grease. Also, by arranging a recess at a position between the pair of raceways, heat produced by friction with the tapered rollers can be readily absorbed into the grease in the recess.

TABLE 1

| Tapered roller bearing | Residual austenite content (vol %) | Endurance life (times) | Life ratio |
| --- | --- | --- | --- |
| Example 1 | 28 | 569 × 10⁴ | 3.31 |
| Example 2 | 30 | 776 × 10⁴ | 4.51 |
| Example 3 | 33 | 629 × 10⁴ | 3.67 |
| Comparative Example 1 | 20 | 234 × 10⁴ | 1.36 |
| Comparative Example 2 | 38 | 252 × 10⁴ | 1.47 |
| Comparative Example 3 | 28 (carburized layer only) | 182 × 10⁴ | 1.06 |

TABLE 1-continued

| Tapered roller bearing | Residual austenite content (vol %) | Endurance life (times) | Life ratio |
| --- | --- | --- | --- |
| Comparative Example 4 | 45 (carburized layer only) | 172 × 10⁴ | 1.00 |

What is claimed is:

1. A wheel bearing device comprising a tapered roller bearing for rotatably supporting a wheel on an axle, said tapered roller bearing including an outer ring having at least one raceway formed on an inner periphery thereof, at least one inner ring having a raceway on an outer periphery thereof so as to be opposed to the raceway of said outer ring, and a plurality of tapered rollers disposed between said opposed raceways, characterized in that a carburized and nitrided layer containing 0.80 wt % or more carbon and having a Rockwell hardness of 58 or over is formed on at least one of a surface of said inner ring and surfaces of said tapered rollers, said carburized and nitrided layer having a residual austenite content of 25–35 vol %.

2. The wheel bearing device as claimed in claim 1 wherein said at least one raceway of said outer ring comprises a plurality of rows of raceways formed on the inner periphery of said outer ring, wherein said at least one inner ring comprises a plurality of inner rings having rows of raceways respectively formed on the outer peripheries thereof so as to be opposed to said raceways of said outer ring, and wherein a plurality of tapered rollers are disposed between said opposed pairs of raceways in a plurality of rows.

3. The wheel bearing device as claimed in claim 2 wherein a wheel mounting flange is integrally formed on said outer ring.

4. The wheel bearing device as claimed in claim 3 wherein the interior space of the bearing is increased by removing excess material at a portion between said rows of raceways.

5. The wheel bearing device as claimed in claim 3 wherein seal members are provided at both ends of an annular space formed between said outer ring and said inner rings in which are provided said tapered rollers in said plurality of rows, to seal said annular space, one of said seal members being formed of a contact type rubber seal, and the other of said seal members being formed of a non-contact type steel shield.

6. The wheel bearing device as claimed in claim 5, wherein said one of said seal members is provided at the end of said annular space to be located away from an end of the axle, and said other of said seal members is provided at the end of said annular space to be located near the end of said axle.

7. The wheel bearing device as claimed in claim 3 wherein the axle supporting said wheel through said tapered roller bearing is an axle for non-driven wheels.

8. The wheel bearing device as claimed in claim 2 wherein seal members are provided at both ends of an annular space formed between said outer ring and said inner rings in which are provided said tapered rollers in said plurality of rows, to seal said annular space, one of said seal members being formed of a contact type rubber seal, and the other of said seal members being formed of a non-contact type steel shield.

9. The wheel bearing device as claimed in claim 8 wherein the axle supporting said wheel through said tapered roller bearing is an axle for non-driven wheels.

10. The wheel bearing device as claimed in claim 8, wherein said one of said seal members is provided at the end of said annular space to be located away from an end of the axle, and said other of said seal members is provided at the end of said annular space to be located near the end of said axle.

11. The wheel bearing device as claimed in claim 2 wherein the axle supporting said wheel through said tapered roller bearing is an axle for non-driven wheels.

12. The wheel bearing device as claimed in claim 1 wherein the axle supporting said wheel through said tapered roller bearing is an axle for non-driven wheels.

13. The wheel bearing device as claimed in claim 2 wherein the interior space of the bearing is increased by removing excess material at a portion between said rows of raceways.

14. The wheel bearing device as claimed in claim 13, wherein said outer ring includes a flange to be coupled to a hub and a brake rotor, and an annular recess is formed in the inner periphery of said outer ring at a position between the rows of said raceways of said outer ring.

15. The wheel bearing device as claimed in claim 14 wherein distances from axial ends of said recess to ends of said raceways on the side of the smaller ends of said tapered rollers, respectively, are set at 3 mm or over.

16. The wheel bearing device as claimed in claim 14 wherein a depth of said recess is set at about half the difference in radius between the inner peripheral surface of said outer ring on the small end sides of said tapered rollers and the inner peripheral surface of said outer ring on the larger end sides thereof.

17. The wheel bearing device as claimed in claim 13 wherein distances from axial ends of said portion from which excess material is removed to ends of said raceways on the side of the smaller ends of said tapered rollers, respectively are set at 3 mm or over.

18. The wheel bearing device as claimed in claim 13, wherein a depth of said portion from which excess material is removed is set at about half the difference in radius between the inner peripheral surface of said outer ring on the small end sides of said tapered rollers and the inner peripheral surface of said outer ring on the larger end sides thereof.

* * * * *